United States Patent [19]
Pilolla et al.

[11] Patent Number: 4,848,403
[45] Date of Patent: Jul. 18, 1989

[54] FLOW-CONTROL VALVE

[76] Inventors: Joseph J. Pilolla; Patrick M. Pilolla, both of 853 Cedar Ave., Elmhurst, Ill. 60126

[21] Appl. No.: 166,466

[22] Filed: Mar. 10, 1988

[51] Int. Cl.⁴ ............................................. F16K 3/08
[52] U.S. Cl. .............................. 137/625.31; 251/304; 251/340
[58] Field of Search .................... 137/625.31; 251/340, 251/304

[56] References Cited

U.S. PATENT DOCUMENTS

| | | | |
|---|---|---|---|
| 3,331,396 | 7/1967 | Willis | 137/625.31 |
| 3,426,797 | 2/1969 | Baker | 251/340 X |
| 4,098,294 | 7/1978 | Woods | 137/625.31 X |
| 4,554,948 | 11/1985 | Bergmann | 137/625.31 |

FOREIGN PATENT DOCUMENTS

| | | | |
|---|---|---|---|
| 1153581 | 3/1959 | Fed. Rep. of Germany | 251/340 |
| 296164 | 8/1928 | United Kingdom | 137/625.31 |

Primary Examiner—Arnold Rosenthal
Attorney, Agent, or Firm—Kinzer, Plyer, Dorn, McEachran & Jambor

[57] ABSTRACT

A flow-control valve including a separable body and fitting which define a cavity to house a seal assembly having a rotatable seal member with flow ports and a stationary seal member with corresponding flow ports. The rotatable seal member is selectively positionable by means outside the body to position the flow ports into or out of alignment to regulate or shut-off the flow of fluid, as desired.

39 Claims, 2 Drawing Sheets

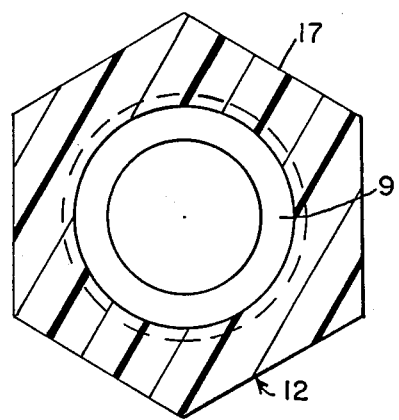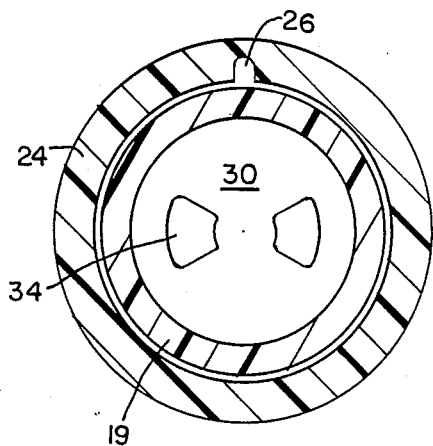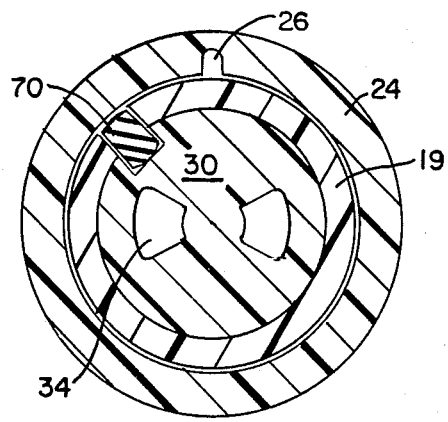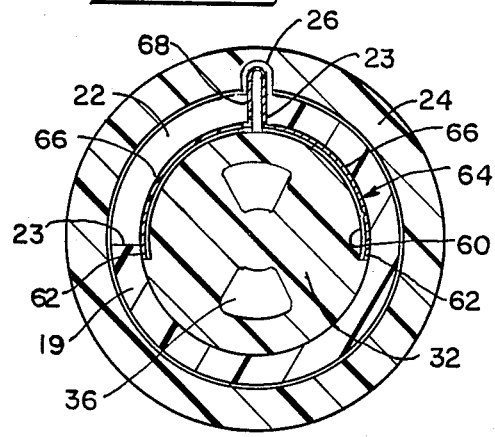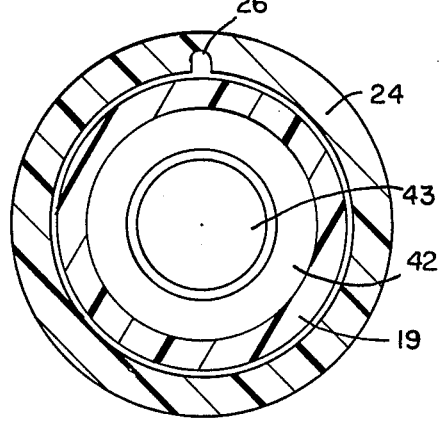

FLOW-CONTROL VLAVE

BACKGROUND OF THE INVENTION

The present invention relates to in-line flow-control valves which seal against the flow of fluid through the valve. Arrangements of this general type are shown in the prior art U.S. Pat. Nos. 263,330; 341,170; 2,556,583; 2,709,566; and 2,883,150. None of these prior art patents teaches a valve formed of a separable body and fitting which define a cavity to house a rotatable seal assembly operable to control fluid flow.

SUMMARY OF THE INVENTION

The present invention provides an in-line flow-control valve incorporating a separable body and fitting which house a rotatable seal assembly operable from outside the body to control the flow of fluid through the valve. The assembled body and fitting define a cavity of finite axial length which receives and retains a seal assembly in fluid tight relation. The seal assembly is comprised of at least one fixed, and one rotatable seal member, having planar surfaces in face-to-face contact. Each seal member contains one or more flow ports which, when aligned, permit flow through the valve. Operating means external to the body and connected to the rotatable seal member, effects rotation of the rotatable member to position the ports of the rotatable seal member either into or out of alignment with the flow ports of the stationary seal member.

In a preferred form the rotatable seal member includes a peripheral relief defining spaced abutment surfaces. An operator disposed in the peripheral relief has ends in operative contact with the abutment surfaces and includes means extending from the body to effect rotation of the rotatable seal member.

BRIEF DESCRIPTION OF THE DRAWINGS

FIG. 3 shows a cross-sectional view of the flow-control valve in FIG. 2 taken along lines 3—3.

FIG. 4 shows a cross-sectional view of the flow-control valve in FIG. 2 taken along lines 4—4.

FIG. 5 shows a cross-sectional view of the flow-control valve in FIG. 2 taken along lines 5—5.

FIG. 6 shows a cross-sectional view of the flow-control valve in FIG. 2 taken along lines 6—6.

FIG. 7 shows a cross-sectional view of the flow-control valve in FIG. 2 taken along lines 7—7.

DETAILED DESCRIPTION OF THE INVENTION

Figure 1:
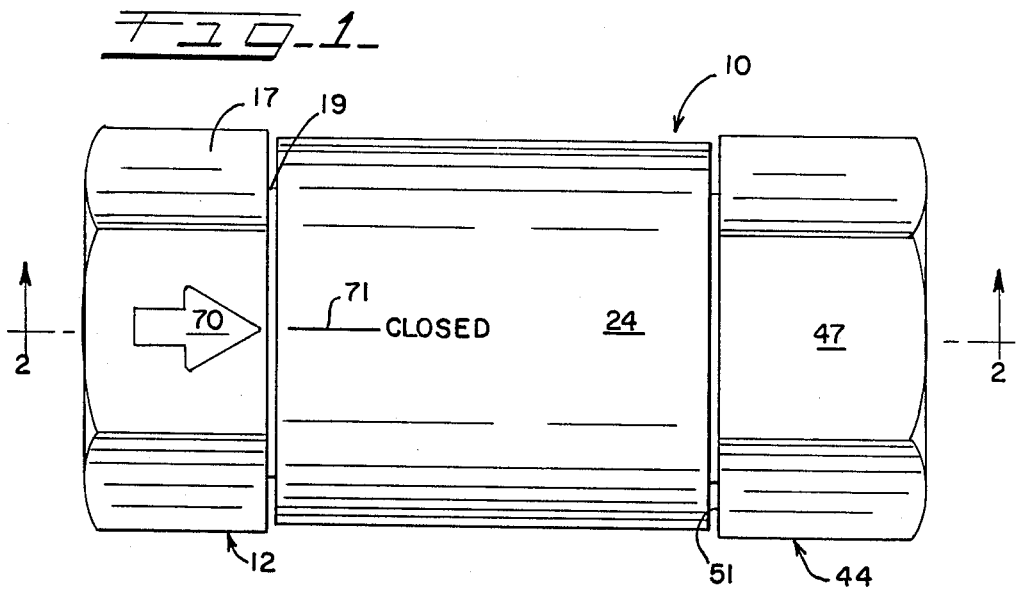
FIG. 1 shows a side view of the flow-control valve of the present invention.
Figure 2:
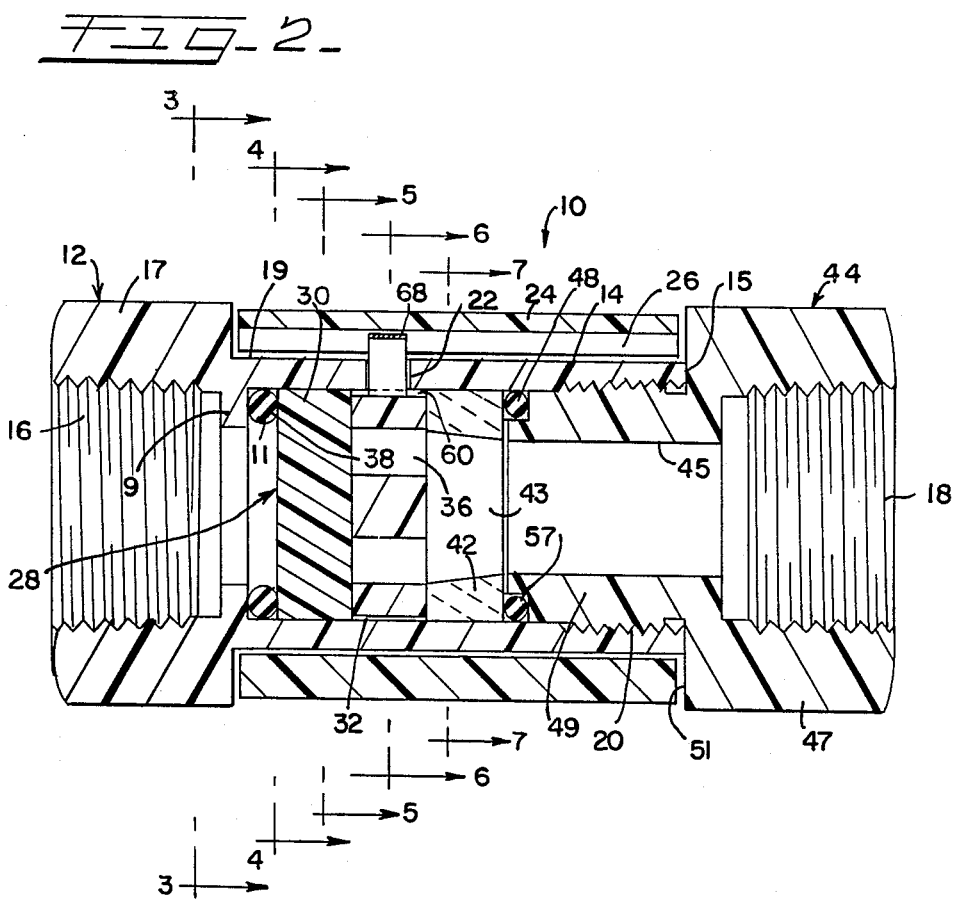
FIG. 2 shows a sectional view of the flow-control valve depicted in FIG. 1 taken along lines 2—2.

A flow-control valve, generally indicated by the numeral 10, is illustrated in FIGS. 1 and 2. The valve 10 includes a substantially elongated, cylindrical body 12 defining a central bore 14, provided with a fluid inlet 16 at one end. An inwardly directed radial wall 9 defines a radial land 11. The opposite end of body 12 terminates in a radial stop surface 15. Bore 14 includes internal threads 20 adjacent radial stop surface 15. Body 12 includes an enlarged hexagonal portion 17, adjacent inlet 16, and the remainder of the body defines a cylindrical portion 19 which extends to radial stop surface 15. As best shown in FIG. 6, a circumferential slot 22 extends partially about the circumference of the body 12 in the cylindrical portion 19, and is opn to bore 14. In this embodiment, the slot extends about 90 degrees. It terminates in stop surfaces 23.

An elongated annular sleeve member 24 open at both ends overlies cylindrical portion 19 of body 12. The sleeve member 24 is relatively rotatable with respect to body 12. A longitudinal groove 26 is formed in the inner cylindrical wall of the sleeve member 24. The sleeve member 24 forms the operative element of an operating means for opening and closing the valve as will be explained.

A fitting 44 is provided which includes a central bore 45 defining a fluid outlet 18. An enlarged hexagonal portion 47 is formed adjacent outlet 18. An annular cylindrical portion 49 extends from the hexagonal portion 47 and includes threads which mate with threads 20 and body 12. The hexagonal portion 47 includes radial stop surface 51 adapted to be abutted by radial stop surface 15 when the fitting 44 is threaded onto threads 20.

Fitting 44 includes an end opposite outlet 18 which includes a counterbore having a radial land 57. With fitting 44 affixed to threads 20 of body 12 and radial stop surface 15 in abutting relation to radial stop surface 51, radial land 11 of body 12 and radial land 57 of fitting 44 define a seal member receiving chamber within the body 12 of a finite axial length. This chamber receives and retains a seal assembly 28 in fluid tight relation.

Seal assembly 28, disposed in the seal member receiving chamber in the assembled body and fitting between radial lands 11 and 57, consists of three separate parts, a stationary seal member 30 secured to the body 12 and fixed against rotation, a rotatable seal member 32 rotatable within the housing 12 and a thrust washer 42.

Each of the seal assembly components is a generally cylindrical disc which includes spaced, parallel planar radial faces. The adjacent faces of the non-rotatable member 30, rotatable member 32 and thrust washer 42 are in face-to-face contact. These surfaces are polished to a degree such that this face-to-face contact seals against the flow or leakage of fluid along these mating faces. The discs of the seal assembly are preferably made of ceramic. It is contemplated, however, that other materials, such as plastic, carbon graphite, or stainless steel could be utilized for the discs.

A second radial face of the non-rotatable member 30 faces radial land 11 of body 12. Similarly, a second radial face of the thrust washer 42 faces radial land 57 of the counterbore in the end of fitting 44. A seal, in the form of an elastomeric O-ring, 38 is provided between ladd 11 and the adjacent face of stationary member 30. A seal, in the form of an elastomeric O-ring, 48 is provided in the counterbore and is disposed between the adjacent radial face of thrust washer 42 and radial land 57. The axial distance between radial lands 11 and 57 defines the finite axial extent of the seal member receiving chamber. Upon attachment of fitting 44 to threads 20 with radial stop surface 15 of body 12 in engagement with radial stop surface 51 of fitting 44, seals, namely O-rings 38 and 48 are placed in compression between the seal assembly and the radial lands 11 and 57. The seals provide a fluid tight seal against the associated radial faces of the seal assembly and the radial stop surfaces 11 and 57 and also provide a predetermined preload upon the discs to urge the contacting faces into fluid tight contact with each other.

Though O-ring seals are illustrated, it is contemplated that a variety of seals could be used. Any form of packing is considered acceptable. It is also thought that expandable elastomeric or metallic bellows could be substituted for the O-ring seals illustrated.

The stationary seal member 30 is pinned to body 12 by pin 70 (FIG. 5). It includes a pair of flow ports 34, as shown in FIG. 4. Although two ports 34 are illustrated, the actual number and size of the ports may vary depending upon the flow conditions of the application. The rotatable seal member 32 also has a pair of flow ports 36, as shown in FIG. 6, which correspond with the ports 34. Thrust washer 42 has a passage 43 which communicates with ports 36 of rotatable seal member 32. The flow ports 36 of the rotatable seal member 32 are arranged relative to the flow ports 34 of the stationary seal member 30 such that rotation of the rotatable seal member 32 varies the size of the orifice defined by the alignment of the corresponding flow ports 34 and 36 of the stationary seal member 30 and the rotatable seal member 32, respectively.

Rotatable seal member or disc 32 includes a peripheral relief 60 best seen in FIG. 6. Relief 60 extends slightly more than 180 degrees about the periphery of disc 32 and terminates in spaced abutment surfaces 62. An operator 64 in the form of an integral thin band lies within relief 60. It includes arcuate legs 66 which conform to the outer peripheral relief 60 and which include ends engaged with abutment surfaces 62.

An upstanding tab 68 is formed intermediate arcuate legs 66 which, as seen in FIGS. 2 and 6, protrudes from body 12 through slot 22. Upstanding tab 68 is disposed within longitudinal groove 26 of outer rotatable sleeve 24 to engage the operator 64 with the sleeve 24. Rotation of the sleeve causes the operator to travel within slot 22. The ends of legs 66 thereby impart rotational forces to disc 32 at abutment surfaces 62. The length of legs 66 is preferably such that when tab 68 is abutting one stop surface 23 of slot 22, the abutment surface 62 is not exposed within the slot. This insures that the operator 64 will be securely retained within the body 12 and also insures smooth operation of the valve.

The tab 68 and ports 36 in the rotatable seal member 32 are in axial alignment, thereby providing an index for indicating the position of the disc 32 relative to the disc 30. Indicia 70 and 71, seen in FIG. 1, may be used to provide an external indication of the status of the valve.

The valve 10 may be assembled by first inserting O-ring 38, seal assembly 28 and O-ring 48 into bore 14 of body 12. Pin 70 is then installed to retain stationary disc 30. Operator 64 may then be inserted through slot 22 with legs 66 disposed in peripheral relief 60 with the ends of the legs against abutment surfaces 62. The operator should be made of steel or suitable plastic to permit the necessary bending or springing of the legs 66 to permit this insertion.

The valve may also be assembled by inserting O-ring 38 and disc 30 and then placing operator 64 within the bore 14. Operator 64 is positioned with the legs 66 against the inner surface of bore 14 with tab 68 protruding from slot 22. Disc 32, disc 43 and O-ring 48 may then be placed within the cavity with the ends of legs 66 in operating contact with abutment surfaces 62.

Rotatable sleeve 24 is then slid onto cylindrical portion 19 of body 14 with tab 68 disposed within groove 26. Rotation of the sleeve will thus cause rotation of operator 64 and rotatable disc 32.

Fitting 44 is tightened onto threads 20 until radial stop surface 15 of body 12 engages radial stop surface 51 of fitting 44. The O-rings 38 and 48 and ceramic seal assembly 28 are compressed between radial lands 11 and 57 to seal the ceramic seal assembly within the cavity with the appropriate preload on the ceramic discs to permit rotation of disc 32 and yet prevent leakage across the contacting faces. Rotatable sleeve 24 is retained on cylindrical relieved portion 19 between hexagonal ends 17 of body 12 and 47 of fitting 44.

The operation of the valve 10 of the present invention is as follows. When the ports 36 of the rotatable seal member 32 are positioned as in FIG. 2 and 6, the "closed" position, the flow of fluid though the valve 10 is prohibited. In this postion, tab 68 engages one of the two stop surfaces 23 of slot 22. When it is desired to permit the flow of fluid through the valve 10, the sleeve member 24 is rotated counter-clockwise in FIG. 6, until tab 68 engages the othe stop surface 23. This aligns the flow ports 36 in the rotatable seal member 32 with the flow ports 34 in the stationary seal member 30. The amount of fluid permitted to flow through the ports 34, 36 can be controlled by varying the degree of rotation and alignment of the ports such that if the sleeve member 24 were rotated 30 or 60 degrees in a counter-clockwise direction, the flow of fluid would not be as great as if the sleeve member 24 were rotated a full 90 degrees. When it is desired to stop, or decrease the flow of fluid through the valve 10, the sleeve member 24 is rotated clockwise toward the "closed" position illustrated in FIG. 6 until the desired result is obtained.

The seal assembly provides a positive stop against flow of fluid in that, when positioned in the closed position, the planar surface of rotatable seal member 32 that is in contact with stationary member 30, closes off flow ports 34. Further, the face-to-face contact of the radial surfaces of the rotatable member 32, maintained by the preload of O-rings 38 and 48, prevents entry of contaminants along the sealing faces. The inclusion of thrust washer 42 in the seal assembly 28 isolates the elastomeric O-ring seals from movement of the rotatable member 32. Relative movement is limited to the planar surfaces of the discs which are in face-to-face contact.

Thus, it has been shown that the present invention provides an in-line flow-control valve with a seal assembly operable from outside the housing, to regulate or prevent the flow of fluid through the valve. Various features of the invention have been particularly shown and described in connection with the illustrated embodiment of the invention, however, it must be understood that these particular arrangements merely illustrate and the invention is to be given its fullest interpretation within the terms of the appended claims.

What is claimed is:

1. A flow-control valve including a body, a fluid inlet defined in said body, said body including an elongated cylindrical portion having a continuous cylindrical wall defining a cylindrical chamber in communication with said inlet, said cylindrical portion having an open end defining a radial stop surface and said portion further defining a radial land at an end of said continuous cylindrical wall axially spaced from said radial stop surface, a separable fitting threadedly engaged with said body defining a fluid outlet, said fitting having an elongated cylindrical portion defining a passage in communication with said fluid outlet and said cylindrical chamber of said body, said cylindrical portion having a radial stop surface adjacent one end thereof in engagement with the radial stop surface of said elongated cylindrical portion of said body, said cylindrical portion of said fitting extendng interiorly of said continuous cylindrical wall of said body and terminating at an end defining a radial land, said radial land defining with said radial land of said body a seal assembly receiving cavity of finite length, a ceramic seal assembly disposed in said chamber between said inlet and said outlet, at least two annular elastomeric seal members, each of which is compressed between one of said radial lands, said ceramic seal assembly and said continuous cylindrical wall, said seal assembly including a stationary, ceramic seal member non-rotatably mounted with respect to said housing, said stationary member defining one or more flow ports therethrough, a rotatable, ceramic seal member disposed adjacent to and in face-to-face contact with said stationary seal member, said rotatable seal member defining one or more ports therethrough, operator means outside the housing connected to said rotatable seal member operable to selectively position said ports of said rotatable seal member into and out of alignment with said ports of said stationary seal member.

2. A valve as in claim 1 in which said operator means includes an elongated sleeve member overlying said cylindrical portion of said body relatively rotatable with respect thereto and a member extending from said rotatable seal member and conneced to said sleeve member for selective positioning of said rotatable seal member with respect to said stationary seal member.

3. A valve as in claim 1 in which said ports of said rotatable and stationary seal members are arranged such that relativel rotation of said seal members between predetermined points varies the size of the orifice defined by the alignment of corresponding ports of said rotatable and stationary seal members.

4. A valve as in claim 1 including an elastomeric seal member disposed between said stationary seal member and said housing.

5. A valve as in claim 1 including a ceramic thrust washer disposed between said housing and said rotatable seal member such that said rotatable seal member is compressed between said stationary seal member on one side and said thrust washer on said other side.

6. A valve as in claim 1 including a removable fitting adapted to be secured to said housing and to exert force against said thrust washer.

7. A valve as in claim 6 including an elastomeric seal member disposed between said removable fitting and said thrust washer.

8. A valve as in claim 1 in which said inlet is axially aligned with said outlet.

9. An in-line flow-control valve for controlling the flow of fluid, said valve comprising an elongated body defining a flow passage having an inlet, a separable fitting secured to said body defining a flow passage in communication with said flow passage of said body and defining an outlet.;

said body including an elongated cylindrical portion having a continuous cylindrical wall defining a cylindrical chamber in communication with said inlet, said cylindrical portion having an open end defining a radial stop surface and said portion further defining a radial land at an end of said continuous cylindrical wall axially spaced from said radial stop surface, a separable fitting threadedly engaged withsaid body defining a fluid outlet, said fitting having an elongated dylindrical portion defining a passage in communication with said fluid outlet and siad cylindrical chamber of said body, said cylindrical portion having a radial stop surface adjacent one end thereof in engagement with the radial stop surface of said elongated cylindrical portion of said body, said cylindrical portion of said fitting exteding ineriorly of said continuous cylindrical wall of said body and terminating at an end defining a radial land, said radial land defining with said radial land of said body a seal assembly receiving cavity of finite length, at least two annular elastomeric seal members, each of which is compressed between one of said radial lands, sid seal assembly and said continuous cylindrical wall.

a seal assembly disposed within said cavity in fluid tight relation;

said seal assembly comprising at least one fixed, and one rotatable seal member having planar surfces in face-to-face sealing contact, each such member containing at least one flow port which when aligned, permits flow through said valve;

said planar surface of said rotatable member being adapted to selectively close said at least one port of said stationary seal member; and operating means external to said body connected to said rotatable seal memer to effect rotation thereof.

10. An in-line flow-control valve as claimed in claim 1 wherein said, operating means includes an elongated sleeve rotatably received upon said elongated cylindrical portion connected to said rotatable seal member.

11. An in-line flow-control valve as claimed in claim 10 wherein said body includes an enlarged hexagonal portion adjacent said inlet and said fitting includes an enlarged hexagonal portion adjacent said outlet, and said sleeve is rotatably received and retained upon said body between said hexagonal portions.

12. An in-line flow-control valve as claimed in claim 10 wherein said operating means includes an operator connecting said sleeve to said rotatable seal member.

13. An in-line flow-control valve as claimed in claim 12 wherein said cylindrical portion of said body includes a circumferential slot extending partially therearound, said operator includes a tab extending from said body through said slot, and said sleeve includes a longitudinal groove which receives said tab.

14. An in-line flow-control valve as claimed in claim 13 wherein aaid rotatable seal member comprises a disc, said disc having a peripheral relief defining spaced abutment surfaces, said operator includes arcuate legs extending from said tab conforming to said outer peripheral relief and having ends engaging said abutment surfaces.

15. An in-line flow-control valve as claimed in claim 14 wherein said abutment surfaces are about 180 degrees apart upon said periphery of said rotatable member.

16. An in-line flow-control valve as claimed in claim 14 wherein said operator comprises an integral thin band defining said arcuate legs and said upstanding tab.

17. An in-line flow-control valve as claimed in claim 14 wherein said circumferential slot terminates in stop surfaces about 90 degrees apart, engagement of said tab with said stop surfaces defining the limit of rotation of said sleeve.

18. An in-line flow-control valve as claimed in claim 9, including means applying a predetermined pre-load upon said planar surfaces of said seal members to urge said planar faces into face-to-face sealing contact.

19. An in-line flow-control valve as claimed in claim 18 including at least one O-ring in said cavity in compression between said seal assembly and one of said radial lands.

20. An in-line flow-control valve as claimed in claim 19 including two O-rings each one of which is in compression between said seal assembly and one of said radial lands.

21. An in-line flow-control valve as claimed in claim 20 wherein said seal assembly includes a thrust washer having a flow passage therethrough in fluid communication with the said at least one flow port of said rotatable seal member, said thrust washer and said rotatable seal member including planar surfaces in face-to-face sealing contact.

22. An in-line flow-control valve as claimed in claim 21 wherein said stationary seal member and said thrust washer each include a second planar face spaced from said planar faces in face-to-face sealing contact with said rotatable seal member, one of said O-rings being compressed between one of said lands and said second planar face of said stationary member and the other of said O-rings being compressed between second planar face of said thrust washer and the other of said lands.

23. An in-line flow-control valve as claimed in claim 9 wherein said seal members comprise ceramic discs.

24. An in-line flow-control valve as claimed in claim 25 wherein said seal members comprise ceramic discs.

25. An in-line flow-control valve for controlling the flow of fluid, said valve defining a flow passage having an inlet, an outlet, and a seal assembly receiving cavity and a circumferential slot- open to said cavity;
   a seal assembly disposed within said cavity in fluid tight relation;
   said seal assembly comprising at least one fixed, and one rotatable disc having planar surfaces in face-to-face sealing contact, each such disc containing at least one flow port which when aligned, permits flow through said valve;
   said planar surface of said rotatable disc being adapted to selectively close said at least one port of said stationary seal member; and
   operating means external to said body connected to said rotatable disc to effect rotation theeof, said operating means including a peripheral relief defining spaced abutment surfaces and an operator extending from said valve through said slot and including legs engaging said abutment surfaces.

26. An in-line flow-control valve as claimed in claim 25 wherein said body includes an elongated cylindrical portion, and said operating means inclu,des an elongated sleeve rotatably received upon said elongated cylindrical portion connected to said rotatable disc.

27. An in-line flow-control valve as claimed in claim 26 wherein said body includes an enlarged hexagonal portion adjacent said inlet and said fitting includes an enlarged hexagonal portion adjacent said outlet, and said sleeve is rotatably receded and retained upon said body between said hexagonal portions.

28. An in-line flow-control valve as claimed in claim 25 wherein said operator includes a tab extending from said body through said slot, and said sleeve includes a longitudinal groove which receives said tab.

29. An in-line flow-control valve as claimed in claim 25 wherein said abutment surfaces are about 180 degrees apart upon said periphery of said rotatable member.

30. An in-line flow-control valve as claimed in claim 28 wherein said operator comprises an integral thin band defining said arcuate legs and said upstanding tab.

31. An in-line flow-control valve as claimed in claim 28 wherein said circumferential slot terminates in stop surfaces about 90 degrees apart, engagement of said tab with said stop surfaces defining the limit of rotation of said sleeve.

32. An in-line flow-control valve as claimed in claim 25, including means applying a predetermined pre-load upon said planar surfaces of said discs to urge said planar faces into face-to-face sealing contact.

33. An in-line flow-control valve as claimed in claim 25 including at least one O-ring in said cavity compressed against said seal assembly.

34. An in-line flow-control valve as claimed in claim 33 including two O-rings each one of which is compressed against said seal assembly.

35. An in-line flow-control valve as claimed in claim 25 wherein said seal assembly includes a thrust washer having a flow passage therethrough in fluid communication with the said at least one flow port of said rotatable disc, said thrust washer and said rotatable disc including planar surfaces in face-to-face sealing contact.

36. An in-line flow-control valve as claimed in claim 35 wherein said stationary disc and said thrust washer each include a second planar face spaced from said planar faces in face-to-face sealing contact with said rotatable disc, one of said O-rings being compressed against said second planar face of said stationary disc and the other of said O-rings being compressed against said second planar face of said thrust washer.

37. An in-line flow control valve as claimed in claim 36 wherein said discs are made of ceramic.

38. An in-line flow-control valve as claimed in claim 25 wherein said discs are made of ceramic.

39. An in-line flow control valve as claimed in claim 34 wherein said discs are made of ceramic.

* * * * *